US010879713B2

(12) United States Patent
Hakla

(10) Patent No.: US 10,879,713 B2
(45) Date of Patent: Dec. 29, 2020

(54) WIRELESS CHARGING DEVICE HAVING FIBER OPTIC ILLUMINATED VISUAL INDICATOR

(71) Applicant: B/E Aerospace, Inc., Winston-Salem, NC (US)

(72) Inventor: Haytham Hakla, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 184 days.

(21) Appl. No.: 16/251,328

(22) Filed: Jan. 18, 2019

(65) Prior Publication Data

US 2020/0235597 A1 Jul. 23, 2020

(51) Int. Cl.
| | |
|---|---|
| *H02J 7/00* | (2006.01) |
| *H02J 50/80* | (2016.01) |
| *H02J 50/90* | (2016.01) |
| *H02J 50/10* | (2016.01) |
| *H02J 7/02* | (2016.01) |
| *H02J 7/04* | (2006.01) |

(52) U.S. Cl.
CPC ............ *H02J 7/0047* (2013.01); *H02J 7/025* (2013.01); *H02J 7/04* (2013.01); *H02J 50/10* (2016.02); *H02J 50/80* (2016.02); *H02J 50/90* (2016.02)

(58) Field of Classification Search
CPC .......... H02J 7/0047; H02J 50/80; H02J 50/90; H02J 50/10; H02J 7/025; H02J 7/04
See application file for complete search history.

(56) References Cited

U.S. PATENT DOCUMENTS

| 5,630,155 A * | 5/1997 | Karaki | F03G 1/00 |
| | | | 322/100 |
| 9,553,960 B1 * | 1/2017 | Liusvaara | H04R 7/10 |
| 2009/0224723 A1 * | 9/2009 | Tanabe | H02J 50/10 |
| | | | 320/108 |
| 2011/0062789 A1 * | 3/2011 | Johnson | A47B 96/20 |
| | | | 307/104 |
| 2014/0291404 A1 * | 10/2014 | Matsuoka | H02J 50/10 |
| | | | 235/462.46 |
| 2019/0305591 A1 * | 10/2019 | Ng | H02J 50/70 |

* cited by examiner

*Primary Examiner* — Arun C Williams
(74) *Attorney, Agent, or Firm* — Suiter Swantz pc llo

(57) ABSTRACT

A wireless charging device and an aircraft monument including the same. The device or monument includes a support surface having a visual indicator embedded therein configured to be illuminated by an underlying charging assembly to indicate a location on the support surface for wirelessly charging a portable electronic device. The wireless charging assembly further includes an induction coil aligned beneath the visual indicator and a fiber optic panel optically coupled to an electrically-powered light source. In use, visible light emitted by the fiber optic panel is transmitted through the visual indicator to illuminate the visual indicator to indicate to a user the location to place the portable electronic device to be charged.

20 Claims, 3 Drawing Sheets

WIRELESS CHARGING DEVICE HAVING FIBER OPTIC ILLUMINATED VISUAL INDICATOR

BACKGROUND

Passengers regularly interact with devices or other items while traveling on aircraft and other conveyances. Personal electronic devices may be supplied by a carrier or may be brought on board by passengers. Either way, the devices require a place to be charged, such that the passengers may enjoy continued use of these devices.

Data or power ports that undergo repetitive insertion and removal of physical or wired connectors may degrade over time. Additionally, having to locate and connect a wired connector to a power port may be difficult or inconvenient for passengers.

Wireless charging has provided an alternative to wired charging, allowing a user to simply set a device atop a service to charge. Because wireless charging utilizes a coil to produce an electromagnetic field to charge a device, the device must be aligned over the center of the coil. Further, no conducting material that could interfere with the electromagnetic field should be placed between the device and the coil for the wireless charger to operate properly.

In smaller, isolated wireless charging pads, the center of the coil is readily identifiable as the central point of the small charging pad itself. However, if a wireless charging coil is positioned under a larger surface it can be difficult to determine where the central axis of the coil is located. For this reason, conventional solutions have included a printed indication of the coil central axis on the charging device or a sticker or other label placed thereon. One disadvantage of these solutions is that they fail to indicate to a user whether the charging device is powered on and/or properly charging.

Other conventional solutions include providing an LED indicator either surrounding the coil or positioned apart from the surface of the wireless charging device that supports the device to be charged, such that the LED indicator does not interfere with the electromagnetic field of the coil. However, these solutions require additional components and dedicated wiring that potentially interferes with the charging capability of the device and is distracting or aesthetically unpleasant.

Therefore, what is desirable is a wireless charging device having a dynamic indicator that allows for aesthetically pleasing feedback not limited to prior size and positioning constraints as a result of the induction coil. Thus, surfaces may be better integrated with inductive charging devices and may be configured to include intricate, customized, and/or aesthetically pleasing illuminated portions for accenting the technological capabilities of the structural environment or assembly.

BRIEF SUMMARY OF THE INVENTIVE ASPECTS

In one aspect, an embodiment of the inventive aspects disclosed herein is directed to a wireless charging assembly including a surface including a visual indicator configured to be illuminated by visible light emitted from beneath the surface, an induction coil disposed beneath the surface and having a center axially aligned with the visual indicator, and a fiber optic panel disposed between the induction coil and the surface, the fiber optic panel configured to be illuminated to emit visible light, wherein light emitted by the fiber optic panel illuminates the visual indicator to indicate where to position a portable electronic device to be wirelessly charged.

In some embodiments, the visual indicator may include at least one aperture formed through at least a portion of the surface.

In some embodiments, the visual indicator may include at least one translucent or transparent inlay embedded in at least a portion of the surface.

In some embodiments, the at least one translucent or transparent plastic inlay may be acrylic.

In some embodiments, the visual indicator may be integrally formed in the surface and a top of the visual indicator may be flush with the surface.

In some embodiments, the fiber optic panel may be a sheet having a thickness less than about 0.1 cm.

In some embodiments, the surface may be part of a monument in an aircraft cabin environment.

In some embodiments, the assembly may further include an electrically-powered light generator optically coupled to the fiber optic panel, and a controller operable for controlling the electrically-powered light generator.

In another aspect, an embodiment of the inventive aspects disclosed herein is directed to an aircraft monument assembly having personal electronic device charging capability, the assembly including an aircraft monument adapted to be positioned in an aircraft and having a surface and a wireless charging device indicator disposed within at least a portion of the surface, and a wireless charging device positioned within the monument directly beneath the wireless charging device indicator. The wireless charging device includes an induction coil and a fiber optic panel disposed between the induction coil and the surface of the aircraft monument, the fiber optic panel configured to emit visible light through the wireless charging device indicator.

In some embodiments, the wireless charging device may further include an electrically-powered light source operable for illuminating the fiber optic panel.

In some embodiments, the electrically-powered light source may include multi-colored LEDs, and the electrically-powered light source may be controlled via a controller operable for powering on or off the assembly and selecting a color of visible light.

In some embodiments, the electrically-powered light source may be at least one of passenger controlled and flight crew controlled.

In some embodiments, the fiber optic panel and the wireless charging device indicator may be illuminated when the electrically-powered light source is powered on.

In some embodiments, the surface of the aircraft monument may include an angled backrest for supporting a portable electronic device charged thereon.

In some embodiments, the surface of the aircraft monument may be movable relative to an aircraft passenger seat.

In another aspect, an embodiment of the inventive aspects disclosed herein is directed to an assembly for an aircraft passenger seating environment including a support surface positioned in proximity to an aircraft passenger seat, a visual indicator disposed in the support surface indicating a wireless charging location for wirelessly charging a portable electronic device, an induction coil disposed beneath the surface in alignment with the visual indicator, a fiber optic panel disposed between the induction coil and the surface, and an electrically-powered light source operable for illuminating the fiber optic panel, wherein the fiber optic panel when illuminated emits visible light that illuminates the visual indicator to indicate the wireless charging location.

In some embodiments, the assembly further includes a controller operable for controlling the electrically-powered light source to control at least one of power and color.

In some embodiments, the visual indicator is a translucent or transparent inlay embedded in the support surface.

In some embodiments, the support surface may be an element of one of an arm rest, a table, a console, and an end bay.

In some embodiments, the support surface other than the visual indicator may not be transparent or translucent.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature or function. In the drawings.

DETAILED DESCRIPTION OF EXEMPLARY EMBODIMENTS

Figure 1:
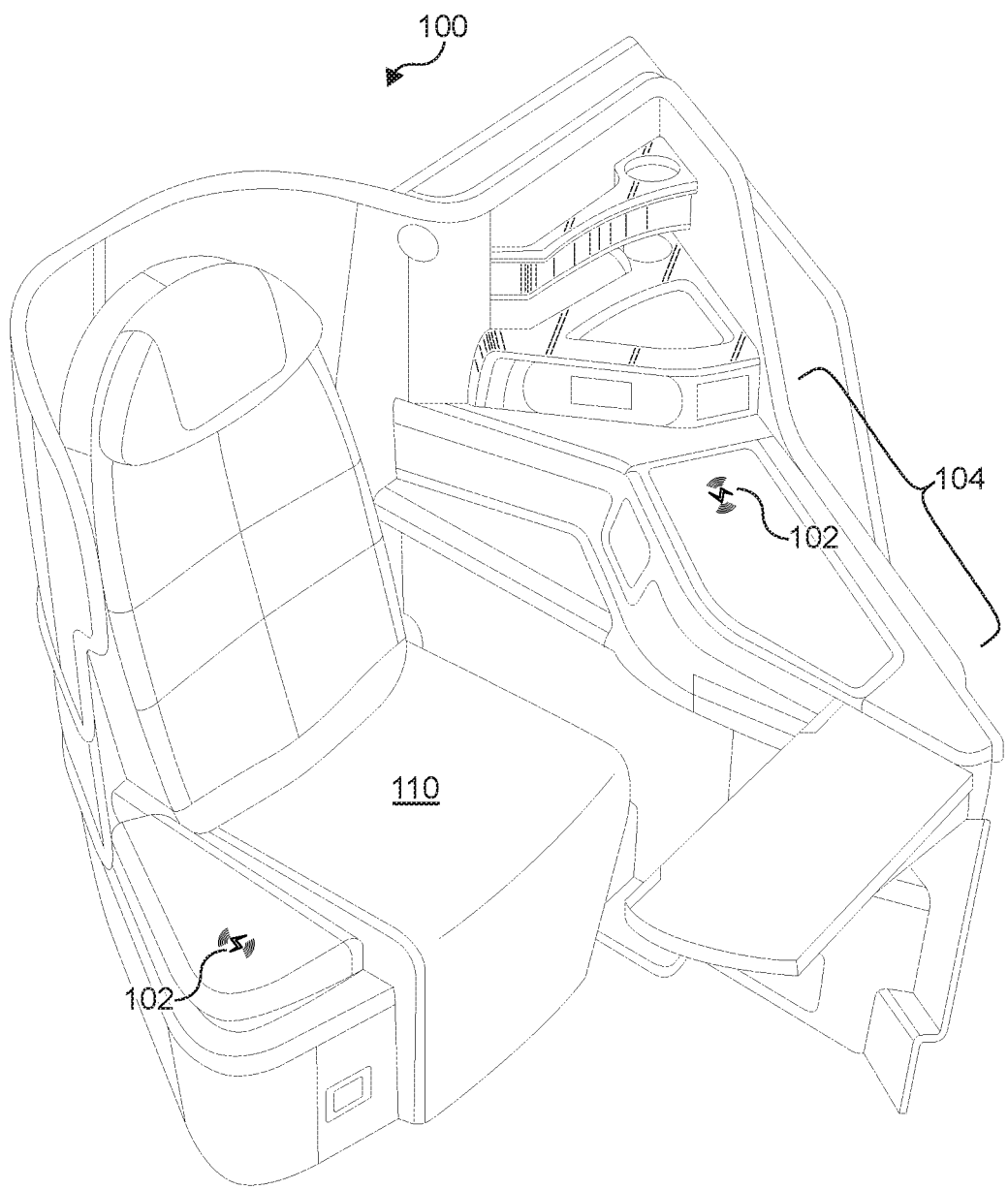
FIG. 1 is a perspective view of a non-limiting example of a wireless charging assembly including a visual indicator within an environment of a premium class aircraft passenger seat, in accordance with an embodiment of the present disclosure.

The inventive concepts are described hereinafter with reference to the accompanying drawings in which exemplary embodiments are shown. However, the inventive concepts may be embodied in many different forms and should not be construed as limited to the representative embodiments set forth herein.

With reference to the drawing figures, the inventive concepts disclosed herein are directed to wireless charging assemblies having dynamic indicators on or within a charging surface that indicate generally a charging location (e.g., central axis) of an electromagnetic coil of or within the wireless charging assembly. The wireless charging assembly may be integral with and/or mountable under aircraft passenger seating monuments or other structures within an aircraft cabin environment.

The visual indicator of the wireless charging assembly may be arranged within and/or displayed through or from the charging surface of the wireless charging assembly such that the visual indicator indicates at least one of the presence of the wireless charger, location of the wireless charger relative to the support surface, wireless charging capability, where and how to position a device to be charged in relation to the inductive charging coil, and the status of the wireless charging assembly. The status may include, but is not limited to, power, operation, mode, availability, charge level, etc. Mode may be, for example, indicative of the operating state of the charger based on the state of the device battery. For example, one displayed color may indicate active charging, while another different color may be used to indicate when charging is complete and a full battery. Other visual indicators may include, but are not limited to, changing colors, transitional colors between discrete states, steady versus flashing lights, audio signals in connection with visual signals, etc. For example, the visual indicator may emit a first color of visible light when the charger is powered on and ready, a second color of light different from the first when the charger is powered on but malfunctioning, no light when the charger is powered off, different colors of light to indicate charger state based on battery state, a predetermined color corresponding to a discrete battery range or level (e.g., red light indicating low charge, orange light indicating charge level above a predetermined threshold level, and green light indicating fully charged), etc.

The visual indicator may be configured (e.g., shaped) to match any housing, encasement and/or support surface shape and design. For example, the color of the light emitted from the visual indicator in the wireless charging assembly may be configured for a particular theme in the area where the wireless charging assembly is installed, such as a premium class aircraft passenger suite. Additionally or alternatively, the visual indicator may be configured as a symbol and/or logo. Example signals may include a familiar lightning bolt or power sign generally recognizable to indicate charging capability. The visual indicator may be a passive indicator, meaning that the visual indicator is ultimately optically coupled to the light source, but does not itself produce or generate visible light. The visual indicator is thus distinguished from an LED indicator. By being passive, the visual indicator can be virtually indistinguishable from the surrounding support surface when the visual indicator is not illuminated.

When not powered, the wireless charging device may emit no light from the visual indicator to inform the user that the wireless charging device may not be used to charge their personal electronic device. Accordingly, the wireless charging assembly may further include a switch (e.g., virtual or physical) to provide the user with the option of powering on the wireless charging device. Additionally or alternatively, the wireless charging assembly may include a switch for turning on/off the light emitted from the visual indicator without turning off the power to the wireless charging device, such that the personal electronic device may be charged by the wireless charging device without emitting any light from the visual indicator of the wireless charging assembly. Moreover, the wireless charging assembly may include a dimmer control for changing the brightness of the light emitted from the visual indicator of the wireless charging assembly. In some embodiments, the wireless charging assembly may include a color control for changing the color of the light emitted from the visual indicator of the wireless charging assembly. The wireless charging assembly may include a controller with wireless connection capabilities (e.g., WiFi, Bluetooth, RF) such that the controls over one or more of the power, light, brightness, color, etc. may be operated remotely. Additionally or alternatively, the wireless charging assembly may include controls, switches, or connections for external controllers such that one or more of the power, light, brightness, color, etc. may be operated.

Referring to FIG. 1, a non-limiting example of a premium class aircraft passenger seating arrangement is shown generally at reference numeral 100, as one of many possible exemplary environments for a wireless charging assembly. A wireless charging device may be mostly hidden below a surface 104 of the structural environment with a charging device indicator 102 visible and incorporated into the surface 104 of the environment 100. There may be multiple wireless charging devices with associated charging device indicators 102. For example, a charging device indicator 102 may be located on any surface of any aircraft monument. The aircraft monument featuring the wireless charging device may be located in convenient proximity to a passenger seat 110 within the environment 100. Examples of aircraft monuments include, but are not limited to, passenger seats, seat elements, furniture, end bays, consoles, tables (fixed or deployable), arm rests, ottomans, partitions, panels, fuselage walls, galleys, cabinets, closets, etc.

Figure 2:
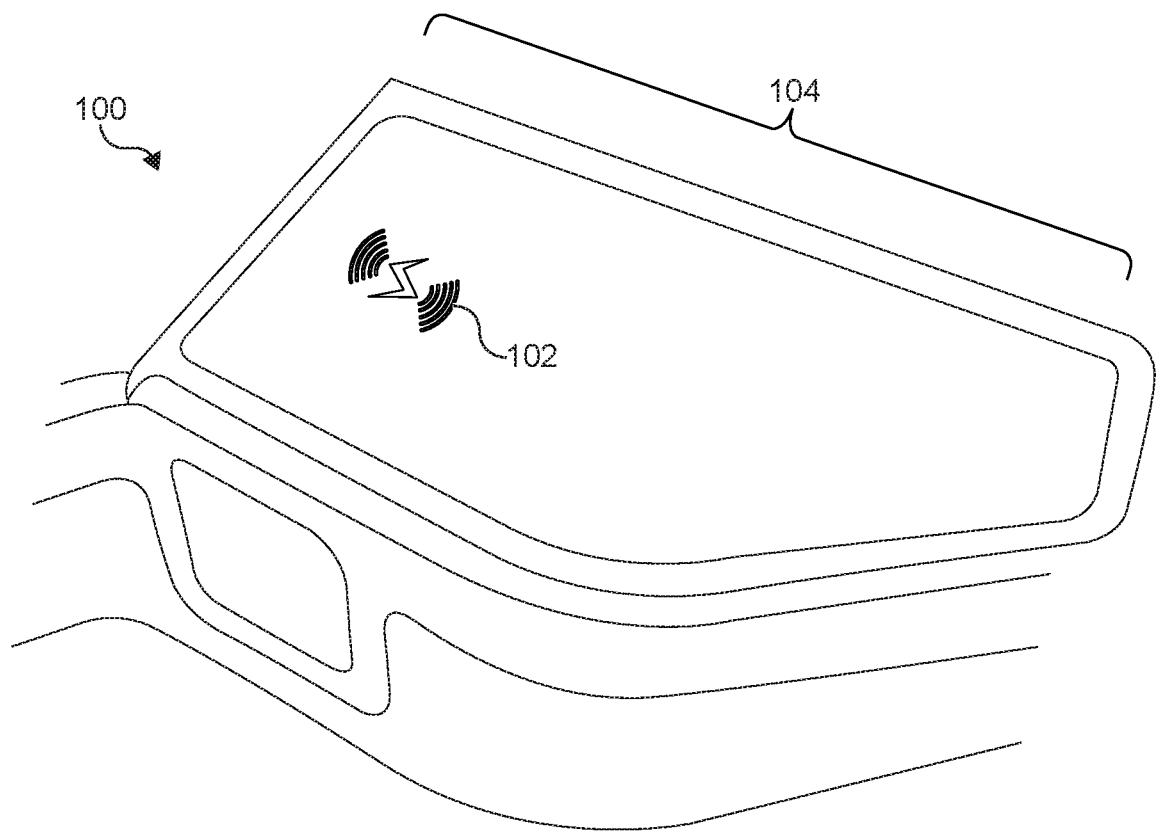
FIG. 2 is a detailed perspective view of a visual indicator for a wireless charging device integrated into a surface, in accordance with an embodiment of the present disclosure.

FIG. 2 shows a detailed perspective view of a backlit indicator 102 for a wireless charging device integrated into a surface 104, in accordance with some embodiments of the present disclosure. The wireless charging assembly may be aesthetically integrated into the clean lines of the designed space, rather than conspicuously obtruding in a disjointed manner. The panel visible in FIG. 2 may include controls incorporated with the various operational aspects of the wireless charging device and assembly, such as but not limited to backlight color and brightness, power modes, etc.

Other passenger or vehicular environments for the wireless charging assembly with a fiber optic backlit indicator are possible. Moreover, the operational environment 100 in which a wireless charging device featuring a charging device indicator 102 is not limited to travel-related environments, but rather may be used in any space where a dedicated surface may be used for placing personal electronic devices.

Providing unobtrusive, clean lines in a designed space, free from cords, clutter, protrusions and separate charging devices can be very advantageous to the aesthetic appeal and organization of the area. This may be especially beneficial within travel spaces, where managing and keeping track of personal items in transit is essential.

In addition to the pleasing visual appearance a wireless and/or inductive charging assembly installation generates, there are numerous technological advantages. For example, the wear on the power and/or data ports on personal electronic devices may be minimized, such that the personal electronic devices enjoy a longer life of use. The inclusion and widespread adoption of wireless charging may lead to personal electronic devices with no external ports whatsoever, increasing the chances for waterproof and/or more resilient devices. In addition to the materials and wear costs that wireless charging assemblies may cutdown, surface-integrated inductive chargers can save users time in not having to inconveniently plug and unplug wired connectors, as well as not having to buy, search for, and replace wired charging components.

Although not shown in FIGS. 1-2, the surfaces in which the wireless charging devices are integrated may include molded and/or movable surfaces for positioning, holding, supporting, cradling, etc. personal electronic devices for users while also charging the personal electronic device. The charging surface may be a bi-folding assembly with different surface treatments and/or sculpted receptacles on one side for use with specific devices, consumables, or other items, and a flat and durable surface on the other side for adapting to many kinds of tasks. The surface portion 104 may be equipped with a tilt mechanism for adjusting the direction that the charging portion 102 faces. The tilt mechanism may have a number of determinate angles available or be infinitely adjustable. Moreover, the surface portion 104 may be a bifold table with a first portion and a second portion pivotably connected, such that the surface portion 104 may unfold for additional work surface area or even differently sized or power-rated induction coils. This is especially advantageous for small or oddly shaped alcoves, in which the space available for stowing a wireless charging assembly is very limited, but a larger work surface area is desired.

Further, the surfaces with integrated charging spots may be equipped with various surface features, including assorted inserts, shapes, sizes, and configurations, which are readily interchangeable for holding different items or devices. The surface portions, accessories, and other wireless charging assembly components may be made from durable lightweight materials including, but not limited to, plastics and aluminum.

In addition to the user benefits derived from the integral wireless charging assembly, the modifiable features (e.g., surface contours, indicator design, lighting choices) of the disclosed wireless charging assemblies facilitate installation into many different structures or monuments, regardless of the seating or environmental dimensions. Accordingly, the wireless charging assemblies and devices of the present disclosure may be mass-produced as modular fittings or installation kits for any type of structure, monument, seating arrangement, table, desk, alcove, surface, interface, furniture, workbench, chamber, kiosk, suite, cockpit, platform, panel, base, cab, compartment, box, podium, case, crate, lavatory, galley, bay, carriage, counter, etc.

Finally, should the passenger no longer desire or need use of the charging portion 102 of the monument or other surface 104, the charging surfaces may still be used for any other purpose. Additionally, the power source for the integrated wireless charging device may be disconnected or shut off in order to ensure no interference with materials or media being used on the charging portion of the surface 104, as confirmed by the visual indicator 102.

Figure 3:
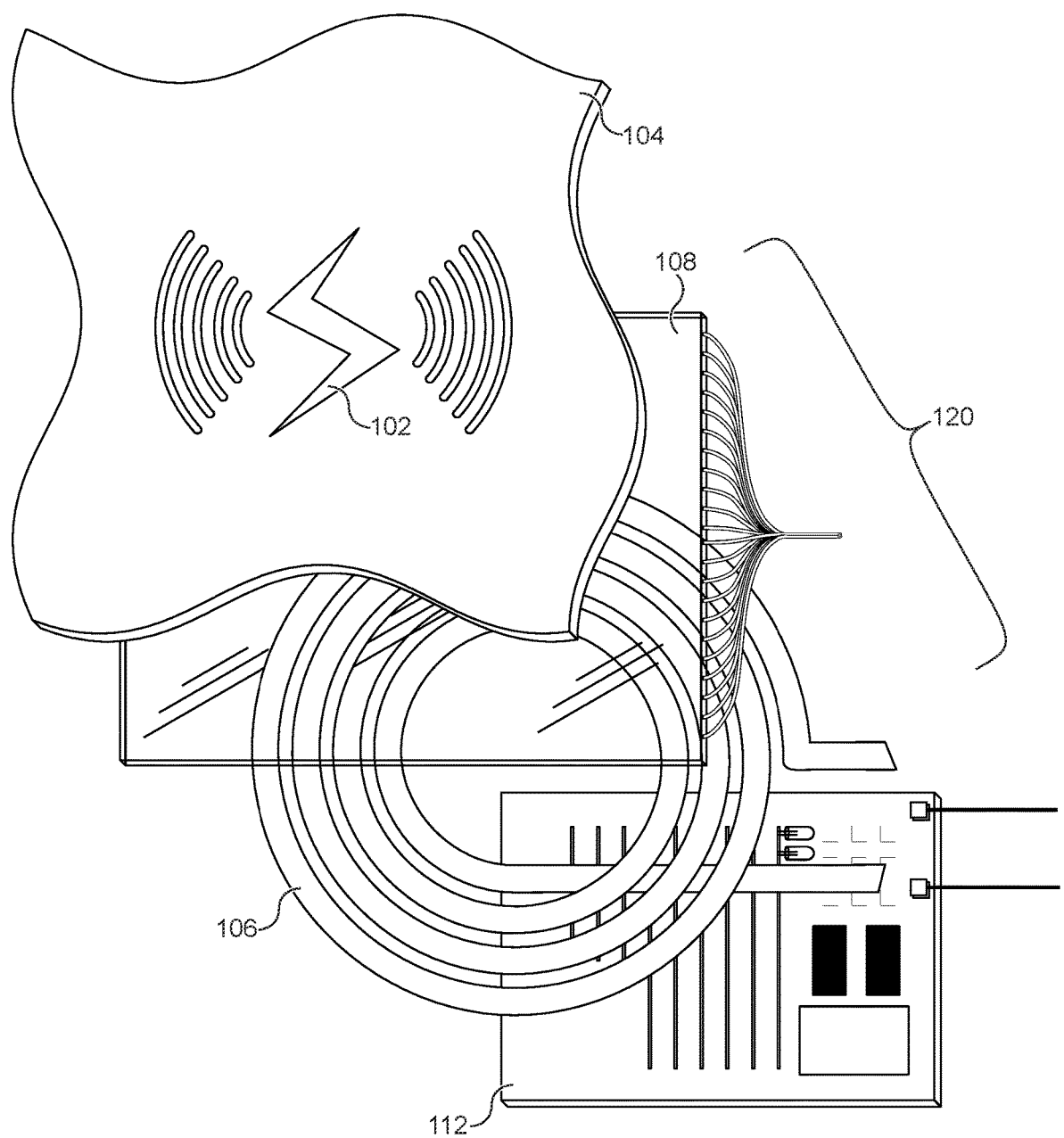
FIG. 3 is an exploded perspective view of an exemplary wireless charging assembly including a fiber optic panel for illuminating a visual indicator of a surface, and an induction coil, in accordance with an embodiment of the present disclosure.

FIG. 3 is an exploded perspective view of an exemplary wireless charging assembly 120 including a fiber optic panel 108 for backlighting the indicator 102 on the surface portion 104 and an induction coil 106.

Conventional wireless charging devices require there to be no metal or conductive materials between the induction coil and the charging surface, so as to not interfere with the electromagnetic field generated by the induction coil. Interrupting the electromagnetic field disrupts the charging capabilities between an inductively coupled wireless charging device and a personal electronic device, thereby undermining the ability to induce a voltage in (i.e., charge) the personal electronic device. Thus, standard lighting elements and the wire connections required therebetween cannot be introduced between the primary coil of the wireless charger and the secondary coil of the personal electronic device. This requirement has inhibited the ways in which wireless charging devices or assemblies can indicate the specific location that the personal electronic device to be charged is placed. Traditional wireless charging devices have accordingly failed to include lighted and/or dynamic indicators for positioning where to position the personal electronic devices to be charged. As such, providing a wireless charging device hidden under a large surface is difficult since there can be no dynamic power state indicators in the area of the primary induction coil.

To solve these deficiencies, the wireless charging assembly 120, as shown in FIG. 3, includes a fiber optic panel 108 that refracts, reflects, transmit or otherwise emits visible light originating from a remote light source (e.g., away from electromagnetic field generated by the primary induction coil) in a bright and uniform manner. The fiber optic panel 108 may be a film including woven optic or scintillating fiber. The fiber optic panel 108 may be surface treated, roughened, formed, printed, etc. such that the translucent/transparent fiber optic panel 108 deflects light in seemingly all or predetermined directions to elicit the appearance of a homogenous panel light source. The fiber optic panel 108 may comprise multiple layers of fiber optic film, as well as reflector layers, etc.

Additionally, the fiber optic panel 108 may be sufficiently thin so as to not interfere or disrupt the inductive coupling between the wireless charging device and the personal electronic device. For example, the fiber optic panel 108 may have a uniform thickness ranging from about 0.013 in. to about 0.1 in.

The fiber optic panel 108 may include or be coupled to a light connector assembly that serves as a light guide, supplying the fiber optic panel 108 with light from a remote light source. The light connector assembly may convert a flattened array of optic or scintillating fibers (providing a uniform light supply along the edge of the fiber optic panel 108) into a compact, cylindrical bundle of optic fibers that may be threaded and/or positioned to connect back to the remote light source, located outside the electromagnetic field generated by the induction coil 106.

Finally, the wireless charging assembly 120 may include a printed circuit board (PCB) or control panel 112, for controlling the operations of the wireless charging assembly 120. The control panel 112 may include communications modules for receiving remote and/or wireless data communications, such as instructional signals. The control panel 112 may include components such as light sources and/or connections, power sources and/or connections, controllers for the light source, power source, etc.

The foregoing description provides embodiments of the inventive concepts by way of example only. It is envisioned that other embodiments may perform similar functions and/or achieve similar results. For example, the wireless charging devices may include forms of conductive charging. Any and all such equivalent embodiments and examples are intended to be covered by the appended claims.

What is claimed is:

1. A wireless charging assembly, comprising:
 a surface including a visual indicator configured to be illuminated by visible light emitted from beneath the surface;
 an induction coil disposed beneath the surface and having a center axially aligned with at least a portion of the visual indicator; and
 a fiber optic panel disposed between the induction coil and the surface, the fiber optic panel configured to emit visible light;
 wherein light emitted by the fiber optic panel illuminates the visual indicator.

2. The wireless charging assembly of claim 1, wherein the visual indicator indicates a status of at least one of the wireless charging assembly and a battery level of a device being charged by the wireless charging assembly.

3. The wireless charging assembly of claim 1, wherein the visual indicator comprises at least one aperture formed through at least a portion of the surface.

4. The wireless charging assembly of claim 1, wherein the visual indicator comprises at least one translucent or transparent inlay embedded in at least a portion of the surface.

5. The wireless charging assembly of claim 4, wherein the at least one translucent or transparent plastic inlay is acrylic.

6. The wireless charging assembly of claim 1, wherein the visual indicator is integrally formed in the surface and a top of the visual indicator is flush with the surface.

7. The wireless charging assembly of claim 1, wherein the surface is part of a monument in an aircraft cabin environment.

8. The wireless charging assembly of claim 1, further comprising an electrically-powered light generator optically coupled to the fiber optic panel, and a controller operable for controlling the electrically-powered light generator.

9. An aircraft monument assembly having personal electronic device charging capability, comprising:
 an aircraft monument adapted to be positioned in an aircraft and having a surface and a wireless charging device indicator disposed within at least a portion of the surface; and
 a wireless charging device positioned within the monument beneath the wireless charging device indicator, the wireless charging device comprising:
 an induction coil, and
 a fiber optic panel disposed between the induction coil and the surface of the aircraft monument, the fiber optic panel configured to emit visible light to illuminate the wireless charging device indicator to indicate a status of at least one of the wireless charging device and a battery level of a device being charged by the wireless charging device.

10. The aircraft monument assembly of claim 9, wherein the wireless charging device further comprises an electrically-powered light source for illuminating the fiber optic panel.

11. The aircraft monument assembly of claim 10, wherein the electrically-powered light source comprises multi-colored LEDs, and wherein the electrically-powered light source is controlled via a controller operable for at least one of powering on or off the assembly and selecting a color of visible light.

12. The aircraft monument assembly of claim 10, wherein the electrically-powered light source is at least one of passenger controlled and flight crew controlled.

13. The aircraft monument assembly of claim 10, wherein the fiber optic panel and the wireless charging device indicator are illuminated when the electrically-powered light source is powered on.

14. The aircraft monument assembly of claim 9, wherein the surface of the aircraft monument comprises an angled backrest for supporting a portable electronic device being charged thereon.

15. The aircraft monument assembly of claim 9, wherein the surface of the aircraft monument is movable relative to an aircraft passenger seat.

16. An assembly for an aircraft passenger seating environment, comprising:
 a support surface positioned in proximity to an aircraft passenger seat;
 a visual indicator disposed in the support surface corresponding to a wireless charging location for wirelessly charging a portable electronic device; and
 a wireless charger, comprising:
 an induction coil disposed beneath the surface in alignment with the visual indicator;
 a fiber optic panel disposed between the induction coil and the surface; and
 an electrically-powered light source operable for illuminating the fiber optic panel;
 wherein the fiber optic panel illuminates to illuminate the visual indicator to indicate a status of at least one of the wireless charger and a battery level of a device being charged by the wireless charger.

17. The assembly of claim 16, further comprising a controller operable for controlling the electrically-powered light source to control at least one of power of the wireless charger and color emitted by the electrically-powered light source.

18. The assembly of claim 16, wherein the visual indicator is a translucent or transparent inlay embedded in the support surface.

19. The assembly of claim 16, wherein the support surface is an element of one of an arm rest, a table, a console, and an end bay.

20. The assembly of claim 16, wherein the support surface other than the visual indicator is not transparent or translucent.

\* \* \* \* \*